United States Patent [19]

Stelzer

[11] 4,161,854
[45] Jul. 24, 1979

[54] MOUNTING DISK FOR THE FIXATION OF LOOSELY INSTALLED SEALING SHEETS

[75] Inventor: Harry Stelzer, Troisdorf-Sieglar, Fed. Rep. of Germany

[73] Assignee: Dynamit Nobel AG, Fed. Rep. of Germany

[21] Appl. No.: 766,502

[22] Filed: Feb. 7, 1977

[30] Foreign Application Priority Data

Feb. 5, 1976 [DE] Fed. Rep. of Germany ....... 7603185

[51] Int. Cl.² .............................................. B32B 7/08
[52] U.S. Cl. ..................................... 52/309.1; 52/515; 52/550; 52/713; 151/59; 151/68; 248/205 A
[58] Field of Search ........................ 151/33, 55, 59, 66, 151/67, 68, 41.7; 85/50 R; 248/205 A, 216.2, 216.3, 216.4; 52/741, 410, 713, 553, 549, 249, 309.1, 515, 550

[56] References Cited

U.S. PATENT DOCUMENTS

| 290,712 | 12/1883 | Shaw | 151/33 |
|---|---|---|---|
| 560,722 | 5/1896 | Johnson | 151/68 |
| 918,055 | 4/1909 | Johnston | 151/59 |
| 1,562,907 | 11/1925 | Morgan | 151/33 |
| 1,724,394 | 8/1929 | Chamberlain | 85/50 R |
| 1,971,396 | 8/1934 | DeWaide | 248/205 R |
| 2,097,465 | 11/1937 | Morrison | 151/59 |
| 2,580,231 | 12/1951 | Lamm | 248/205 A |
| 3,486,797 | 12/1969 | Osborne | 151/59 |
| 3,666,225 | 5/1972 | Weinberger | 248/205 A |
| 3,678,980 | 7/1972 | Gutshall | 151/41.7 |

FOREIGN PATENT DOCUMENTS 21805 10/1907 United Kingdom ...................... 151/65

Primary Examiner—Marlen Parsens, Jr.
Attorney, Agent, or Firm—Craig and Antonelli

[57] ABSTRACT

A mounting disk arrangement is provided for the fixation of loosely installed sealing sheets of a synthetic resin, wherein the mounting disk is attachable to a substrate, such as a substrate on a roof, for example a trapezoidal roof, by means of a screw passed through the mounting disk. In order to prevent unturning of the screw, a blocking mechanism in the form of a member attached to the mounting disk and engageable in the screw slots of the screw is provided. In preferred embodiments, the blocking apparatus consists of a leaf spring, while other embodiments include plate members attached to the mounting disk.

10 Claims, 9 Drawing Figures

MOUNTING DISK FOR THE FIXATION OF LOOSELY INSTALLED SEALING SHEETS

BACKGROUND AND SUMMARY OF THE INVENTION

The present invention relates to a mounting disk for the fixation of loosely installed sealing sheets of a synthetic resin, wherein the mounting disk can be attached to a sub-structure, such as a roof, e.g. a trapezoidal roof, by means of a screw passed through the mounting disk.

Such mounting disks have been disclosed, for example, in DOS's [German Laid-Open Unexamined Applications] 1,658,883 and 2,300,798, respectively.

FIG. 1 of the drawings of this application shows a utilization of a mounting disk for a trapezoidal roof with a synthetic resin sealing sheet laid loosely thereon. The roof construction 10 consists of the trapezoidal metal sheet 11 on which the thermal insulating layer 12 is loosely placed. The thermal insulating layer is composed of individual heat insulating panels; the mounting disk 15 in the form of a sheet-metal disk with a synthetic resin coating 18 on the topside is provided in each case on the butt joints of these panels. The mounting disk is equipped with a central bore through which a fastening screw 14 is passed and threadedly attached through the heat insulating layer 12 to the substructure 11.

The synthetic resin sealing sheets 17 are laid over the heat insulation 12 and the mounting disks 15 and affixed to the synthetic resin coating 18 of the mounting disk 15, for example by means of gluing, solution welding, or high-frequency welding. It has now been found that, for example, in case of high wind suction forces, the roofing sheet can be forced upward through the fastening screws and/or the screw head can even be pressed through the sealing sheets. Especially in case of lightweight roofs, such as trapezoidal roofs, for example, wherein movements of the supporting substructure may also occur, for instance due to vibrations, the fastening screws 14 can unturn and thus endanger the entire roof covering and the roof sealing sheets. Since this uprising of the fastening screws by unturning occurs particularly in case of vibrations and under wind loads, the screws must be repeatedly tightened. During such operations, damage to the sealing sheet can occur, in particular.

The present invention is based on the object of preventing this uprising of the fastening screws by excluding an unturning motion of the fastening screw. This is accomplished in accordance with the invention by attaching a blocking means at the mounting disk to prevent an unturning of the fastening screw passed through the mounting disk and connected to the substrate. This attachment can be releasable or fixed, movable or immobile according to different preferred embodiments of the invention.

The blocking means can be mounted to be rotatable in certain embodiments so that it is possible to uncover the central area of the mounting disk with the bore for the fastening screw in order to introduce the latter. Advantageously, a leaf spring is provided as the blocking means; this spring being bent away at one end vertically toward the mounting disk for engaging the topside slot of the head of the fastening screw. For the preferred field of application, the blocking means is made of a corrosion-resistant material, for example spring steel. The leaf spring exerts a constant pressure on the inserted fastening screw so that an unturning of the fastening screw, for example in case of vibrations, is impossible. Based on the length of the leaf spring, as well as its configuration, a correspondingly high spring force, i.e., retaining force, can be exerted.

It is also contemplated to fix the leaf spring in position at a point of the mounting disk by means of tongues [lugs] in certain embodiments, wherein the tongues are formed by bending them upwardly from the mounting disk.

However, other embodiments are contemplated where the blocking means consist of a metal plate preferably laminated on both sides with synthetic resin film and formed with a projecting edge for engagement into the head of the screw. This blocking means can then be fixed after engagement on the mounting disk, for example, by solution welding, gluing, welding, or the like.

These and further objects, features and advantages of the present invention will become more obvious from the following description when taken in connection with the accompanying drawings which show, for purposes of illustration, several embodiments in accordance with the present invention.

DETAILED DESCRIPTION OF THE DRAWINGS

Figure 2:
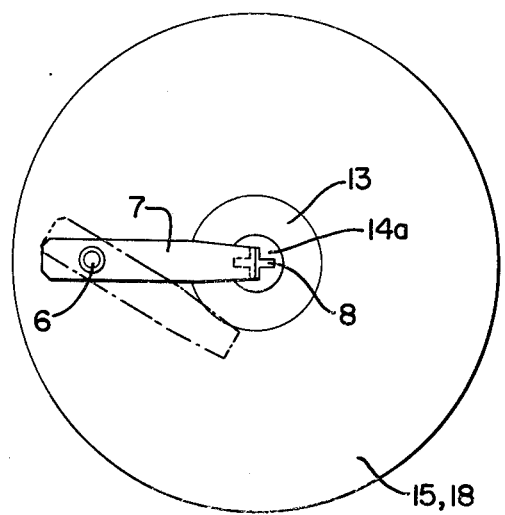
FIG. 2 is a schematic top view of a mounting disk construction according to a first preferred embodiment of the present invention.
Figure 3:
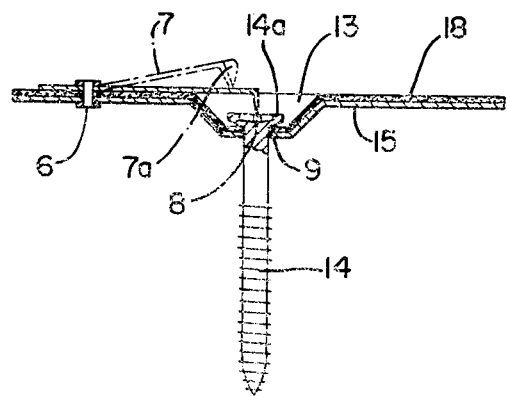
FIG. 3 is a side sectional view of the construction of FIG. 2.

According to FIGS. 2 and 3, the mounting disk 15 is fashioned with the central, cup-shaped indentation 13, the topside of the mounting disk 15 being provided with the synthetic resin coating 18. The bore 9 for passing the fastening screw 14 therethrough is provided in the cup-shaped indentation 13. On the topside of the mounting disk 15, the blocking means in the shape of the leaf spring 7 is rotatably attached by means of the rivet 6. This leaf spring 7 is bent at its end in the zone of the screw head 14a at a right angle with respect to the screw head 14a toward the latter; this edge 7a being adapted to the profiling of the slot or slots 8 in the screw head 14a. The length of the leaf spring 7 from the point of attachment 6 on the mounting disk 15 up to the front edge 7a is chosen so that the front edge 7a can engage into the slots of the screw head. By means of the rotatable mounting of the leaf spring 7 on the mounting disk, it is possible to move the spring out of the area of the bore 9 for accommodating insertion and tightening of the fastening screw 14, as is shown by the dashed-line position in FIG. 2. After passing the fastening screw 14 through and threading same into the substrate, the screw head can then be fixed in position by placing the edge 7a of the leaf spring into the screw head and/or into the slot 8 of the screw head.

Figure 1:
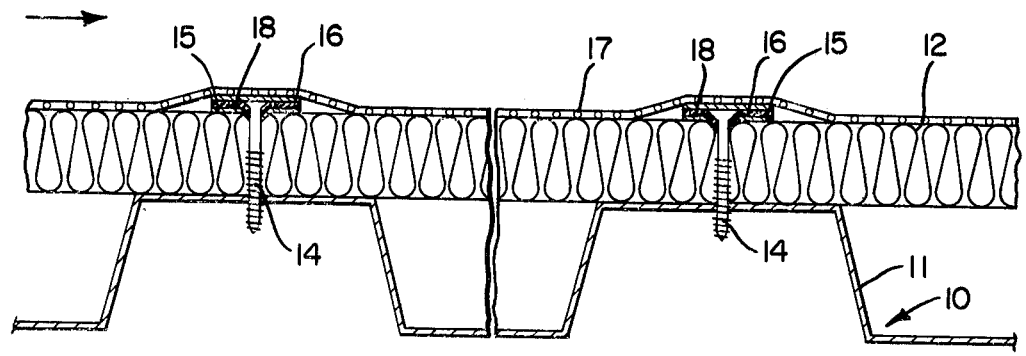
FIG. 1 is a schematic sectional view of a roof structure and mounting disk arrangement of the type contemplated by the present invention.
Figure 4:
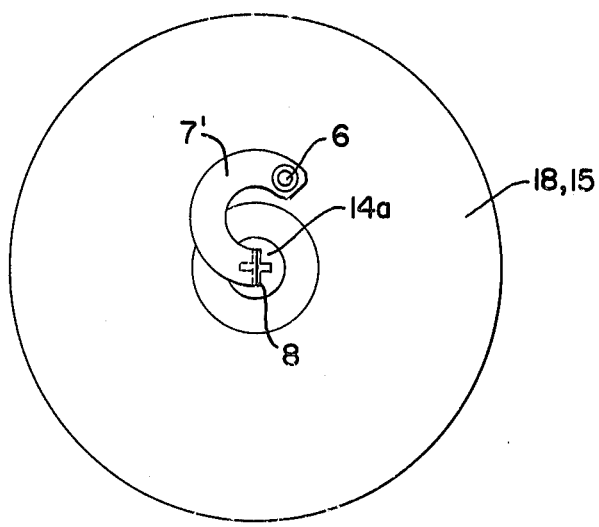
FIG. 4 is a schematic top view of a mounting disk construction according to a second preferred embodiment of the present invention.
Figure 5:
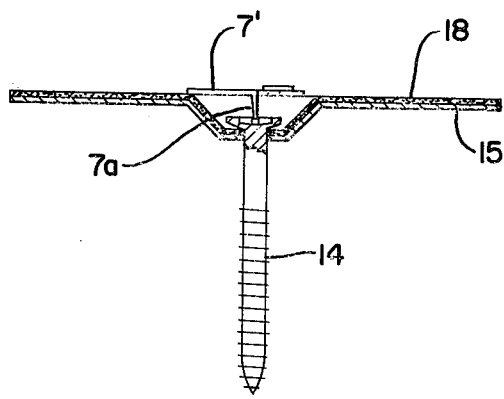
FIG. 5 is a side sectional view of the construction of FIG. 4.

FIGS. 4 and 5 show a further modification of the invention in a top view and in a cross-sectional view. In a deviation from the embodiment of FIGS. 2 and 3, the leaf spring 7' is here of a shape which is bent in the form of a spiral within a plane. The blocking means provided in accordance with the invention should suitably be of a flat configuration, so that, during a utilization according to FIG. 1, the flat placement and attachment of the roof sealing sheet is not impeded.

Figure 6:
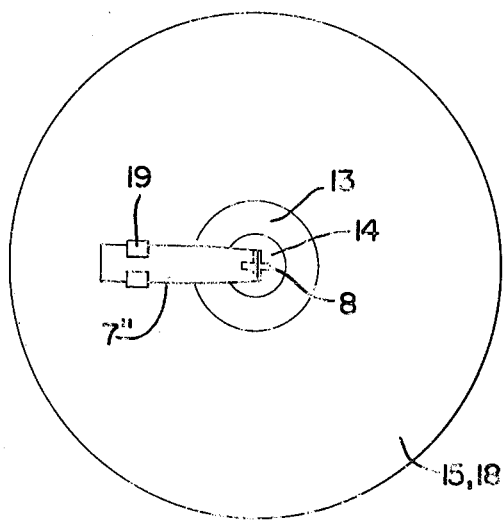
FIG. 6 is a schematic top view of a mounting disk construction according to a third preferred embodiment of the present invention.
Figure 7:
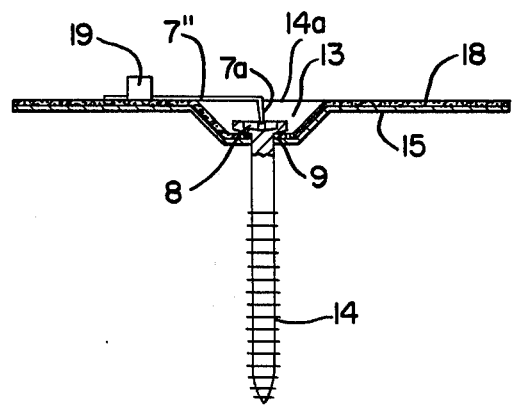
FIG. 7 is a side sectional view of the construction of FIG. 6.

FIGS. 6 and 7 show, in a top view and in a cross-sectional view, a further embodiment of the invention. Two tongues 19 are bent upwardly from the mounting disk 15 so that the leaf spring 7" is clamped in position therebetween on the mounting disk. However, this also prevents the subsequent uprising of the screw 14.

Figure 8:
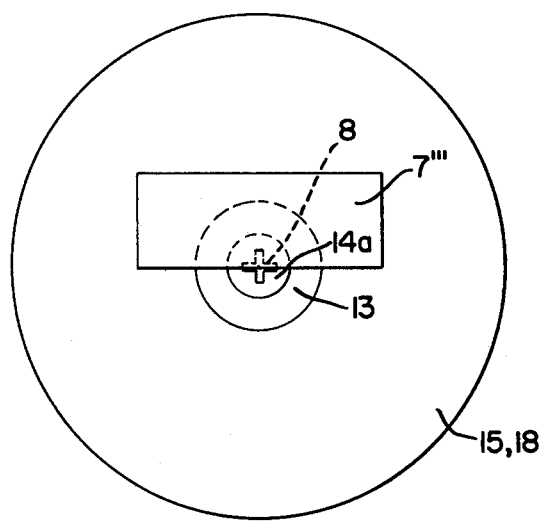
FIG. 8 is a schematic top view of a mounting disk construction according to a fourth preferred embodiment of the present invention.
Figure 9:
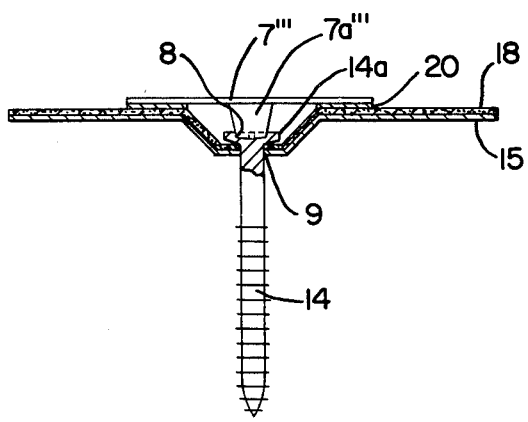
FIG. 9 is a side sectional view of the construction of FIG. 8.

According to FIGS. 8 and 9, the mounting disk 15 is fashioned, for example, with the central, cup-shaped indentation 13, the topside of the mounting disk 15 being provided with the synthetic resin coating 18. The bore 9 for passing the fastening screw 14 therethrough is arranged in the cup-shaped indentation 13. The blocking means in the shape of the plate 7''' of metal, laminated on both sides with synthetic resin film and formed with an edge 7a''' bent vertically on one side approximately in the center, is attached to the topside of the mounting disk 15, for example by means of a solution welding agent 20. This edge 7a''' of the blocking means 7''' is adapted, in the zone of the screw head 14a, to the configuration of the slots 8 in the screw head 14a. After the fastening screw 14 has been passed through and threaded into the substrate, the edge 7a''' of the blocking means 7''' can be fixed in position in the slot 8 of the screw head 14a, and the blocking means 7''' proper is welded in this position on the topside together with the mounting disk 15, preferably by solution welding. A gluding step is also possible in this connection.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Mounting disk arrangement for the fixation of loosely installed sealing sheets of a synthetic resin, wherein the mounting disk can be attached to a substructure by means of a screw passed through the mounting disk; said mounting disk arrangement including:
   a mounting disk,
   a screw passed through the mounting disk for connecting the same to a substrate,
   and a blocking means attached to the mounting disk to prevent the unturning of the screw passed through the mounting disk and connected to the substrate,
   said mounting disk, said screw, and said blocking means being arranged whereby said sealing sheets of a synthetic resin can be affixed to said arrangement,
   further including a roof structure beneath said mounting disk, and wherein the mounting disk is attached to said roof structure by means of said screw.

2. Mounting disk arrangement according to claim 1, wherein said roof structure is a trapezoidal roof structure.

3. Mounting disk arrangement according to claim 1, wherein the mounting disk is adapted to have the sealing sheets attached to its upper surface.

4. Mounting disk arrangement for the fixation of loosely installed sealing sheets of a synthetic resin, wherein the mounting disk can be attached to a substructure by means of a screw passed through the mounting disk; said mounting disk arrangement including:
   a mounting disk,
   a screw passed through the mounting disk for connecting the same to a substrate,
   and a blocking means attached to the mounting disk to prevent the unturning of the screw passed through the mounting disk and connected to the substrate,
   said mounting disk, said screw, and said blocking means being arranged whereby said sealing sheets of a synthetic resin can be affixed to said arrangement,
   wherein said mounting disk has a synthetic resin surface on the side of the mounting disk which is adjacent said sealing sheets, whereby the synthetic resin sealing sheets can be affixed to the synthetic resin surface of the mounting disk using affixing means.

5. Mounting disk arrangement for the fixation of loosely installed sealing sheets of a synthetic resin, wherein the mounting disk can be attached to a substructure by means of a screw passed through the mounting disk; said mounting disk arrangement including:
   a mounting disk,
   a screw passed through the mounting disk for connecting the same to a substrate,
   and a blocking means attached to the mounting disk to prevent the unturning of the screw passed through the mounting disk and connected to the substrate,
   said mounting disk, said screw, and said blocking means being arranged whereby said sealing sheets of a synthetic resin can be affixed to said arrangement,
   said blocking means consisting of a metal plate having an edge projecting on one side for engagement into the screw-head and being fixedly and undetachably connected to the mounting disk, said blocking means being coated on both sides with a synthetic resin.

6. Mounting disk arrangement according to claim 5, wherein said mounting disk has a synthetic resin surface on the side of the mounting disk which is adjacent said sealing sheets.

7. Mounting disk arrangement for the fixation of loosely installed sealing sheets of a synthetic resin, wherein the mounting disk can be attached to a substructure by means of a screw passed through the mounting disk; said mounting disk arrangement including:
   a mounting disk, a screw passed through the mounting disk for connecting the same to a substrate, and a blocking means attached to the mounting disk to prevent the unturning of the screw passed through the mounting disk and connected to the substrate, said mounting disk, said screw, and said blocking means being arranged whereby said sealing sheets of a synthetic resin can be affixed to said arrangement, said blocking means consisting of a corrosion-resistant material and consisting of a metal plate having an edge projecting on one side for engagement into the screw head, and wherein this blocking means is fixedly and undetachably connected to the mounting disk, said blocking means being coated on both sides with a synthetic resin.

8. Mounting disk arrangement according to claim 7, wherein said mounting disk has a synthetic resin surface on the side of the mounting disk which is adjacent said sealing sheets.

9. Mounting disk arrangement according to claim 8, wherein the mounting disk is adapted to have the sealing sheets attached to its upper surface.

10. Mounting disk arrangement for the fixation of loosely installed sealing sheets of a synthetic resin, wherein the mounting disk can be attached to a substructure by means of a screw passed through the mounting disk; said mounting disk arrangement including:

a mounting disk, a screw passed through the mounting disk for connecting the same to a substrate, and a blocking means attached to the mounting disk to prevent the unturning of the screw passed through the mounting disk and connected to the substrate, said mounting disk, said screw, and said blocking means being arranged whereby said sealing sheets of a synthetic resin can be affixed to the arrangement of the mounting disk, the screw and the blocking means, said mounting disk arrangement having sealing sheets of a synthetic resin affixed to the arrangement of the mounting disk, screw and blocking means.

* * * * *